United States Patent [19]
Cordia et al.

[11] Patent Number: 5,341,915
[45] Date of Patent: Aug. 30, 1994

[54] ARTICLE PHASING, TRANSFER AND SQUARING SYSTEM FOR PACKAGING LINE

[75] Inventors: Joseph R. Cordia, Lilburn; Bruce H. Dalrymple, Loganville; William G. Hennig, Social Circle; Robert W. McReady, Snellville; John J. Metraw, Ellenwood, all of Ga.

[73] Assignee: Kliklok Corporation, Decatur, Ga.

[21] Appl. No.: 972,607

[22] Filed: Nov. 6, 1992

[51] Int. Cl.$^5$ .............................................. B65G 47/26
[52] U.S. Cl. ..................................... 198/460; 198/461
[58] Field of Search ............... 198/415, 572, 575, 577, 198/460, 461

[56] References Cited

U.S. PATENT DOCUMENTS

| | | |
|---|---|---|
| 2,840,224 | 6/1958 | Lefief . |
| 3,075,630 | 1/1963 | Fisk . |
| 3,155,221 | 11/1964 | Griner . |
| 3,190,434 | 6/1965 | Dardaine . |
| 3,193,081 | 7/1965 | Harrison et al. . |
| 3,251,452 | 5/1966 | Conway et al. . |
| 3,299,614 | 1/1967 | Brickson . |
| 3,348,655 | 10/1967 | Pierce, Jr. et al. . |
| 3,352,403 | 11/1967 | Blake . |
| 3,382,965 | 5/1968 | Pierce, Jr. et al. . |
| 3,485,339 | 12/1969 | Miller et al. . |
| 3,543,911 | 12/1970 | Brickson . |
| 3,619,977 | 11/1977 | Theys et al. . |
| 3,993,188 | 11/1976 | Muller ............................ 198/461 |
| 4,197,935 | 4/1980 | Aterianus et al. ............... 198/460 |
| 4,257,514 | 3/1981 | Ver Mehren ................... 198/461 X |
| 4,360,098 | 11/1982 | Nordstrom ..................... 198/460-X |
| 4,394,896 | 7/1983 | McComas et al. .............. 198/572 X |
| 4,417,117 | 11/1983 | Opprecht ........................ 198/461 X |
| 4,443,995 | 4/1984 | Myers et al. ..................... 198/461 X |
| 4,514,963 | 5/1985 | Bruno ............................ 198/460 X |
| 4,518,075 | 5/1985 | Aykut et al. .................... 198/460 |
| 4,558,777 | 12/1985 | Francioni ....................... 198/461 |
| 4,604,704 | 8/1986 | Eaves et al. .................... 198/460 X |
| 4,640,408 | 2/1987 | Eaves ............................ 198/460 |
| 4,653,630 | 3/1987 | Bravin ........................... 198/460 |
| 4,815,581 | 3/1989 | Deutschlander ................ 198/461 |
| 4,838,408 | 6/1989 | Brawn ........................... 198/461 X |
| 4,852,717 | 8/1989 | Ross et al. ..................... 198/460 X |
| 4,921,092 | 5/1990 | Crawford et al. ............... 198/460 |
| 5,070,995 | 12/1991 | Schaffer et al. ................. 198/460 |
| 5,082,103 | 1/1992 | Ross et al. ..................... 198/460 |
| 5,083,655 | 1/1992 | Becker .......................... 198/460 |
| 5,092,450 | 3/1992 | Schommartz et al. ........... 198/460 |
| 5,097,939 | 3/1992 | Shanklin et al. ................ 198/460 X |

FOREIGN PATENT DOCUMENTS

| | | |
|---|---|---|
| 0127459 | 12/1984 | European Pat. Off. . |
| 1412679 | 11/1975 | Italy . |
| 53-133861 | 11/1978 | Japan .............................. 198/460 |
| 55-2521 | 1/1980 | Japan .............................. 198/460 |
| 55-44489 | 3/1980 | Japan . |
| 57-160814 | 3/1981 | Japan . |
| 2041863A | 9/1980 | United Kingdom . |

*Primary Examiner*—James R. Bidwell
*Attorney, Agent, or Firm*—King and Schickli

[57] ABSTRACT

A conveyor system to precisely feed articles, such as food product containers, includes a series of conveyors to phase and control the articles along the flow path for further processing downstream. A supply conveyor establishes the initial flow. A phasing conveyor receives the articles in closely spaced relationship and a photoelectric sensor detects each one of the articles at this point along the path. A variable speed motor drives the phasing conveyor in response to the sensor in order to shift each article into its proper position to match the moving segment or flight of the target conveyor. A transfer conveyor operating at the speed of the target conveyor accelerates each article to establish a gap from the next upstream article.

4 Claims, 5 Drawing Sheets

ARTICLE PHASING, TRANSFER AND SQUARING SYSTEM FOR PACKAGING LINE

TECHNICAL FIELD

The present invention relates generally to the field of conveyor systems, and, more particularly to a phasing conveyor system providing in addition proper transfer and squaring of articles for further downstream processing on a packaging line.

BACKGROUND OF THE INVENTION

It is known in the packaging field to provide a continuous feed of articles, such as food product trays or containers, spaced at precise intervals in order to most efficiently accommodate interaction with a downstream processing station of the packaging line, such as a cartoner. This requirement often presents a problem due to the generally non-uniform supply of prepared products from upstream equipment. Inevitably, the processing equipment upstream provides surges with a greater number of containers being sent downstream in a short period of time. Conversely, the equipment sometimes lags behind due to intermittent downtime or other slow-down related intervals. This is most prevalent in the food preparation/packaging field where an even flow of prepared foods is difficult to maintain, especially where some manual intervention takes place.

In the past, others have provided a conveyor system for phasing and controlling the flow of closely spaced small articles, such as candy bars and the like, so that the articles can be fed in a controlled pattern to a wrapping machine. A typical system is shown in the U.S. Pat. No. to Bruno, 4,514,963 issued May 7, 1985. Insofar as we are aware of the prior state of the art equipment, the attempts of others to adapt this type of intelligent conveyor system to handling larger items, such as food entree trays, have not succeeded. Most systems of recent years in the article wrapping field using the teachings of the '963 patent involve a long series of phasing or indexing conveyors, each speed controlled by individual photocell sensors and an electronic controller. Even with this elaborate arrangement, it was not felt possible to reliably fill every carton on a cartoning machine, so no further efforts in this respect have been made. Also, an inherent shortcoming is that a surge or heavy backlog of articles coming into the system is still likely to end up producing a jam causing a shutdown of the packaging line. In most instances, this would result in damage to the product containers, leading to even more undesirable economic losses for the food processing plant.

In an attempt to alleviate the jamming problem, the owners/lessors of cartoning machines of the present assignee and others have, in the past, simply relied on mechanical indexing systems, coupled with running their machines at speeds of as much as 40-50% faster than the supply. Obviously this mode of operation is designed to simply avoid any upstream accumulation of the articles, and particularly to avoid the consequences of surging. Speeding up of the cartoning or other processing machine in this manner to in effect outrun the supply and thus accommodate the surges is not the best solution. In fact, this approach greatly compounds the problem of not being able to fill all of the cartons, thus reducing the overall efficiency of the packaging line.

Speeding up of the cartoning machine to accommodate surges in supply also introduces another problem; i.e. the increased speed makes a jam in the cartoning machine itself a greater possibility, and this in turn further reduces the operating efficiency of the packaging line. The cartoning machines or other processing machines on the line represent a significant capital investment to the owner/lessor, and thus machine efficiency, as well as longevity, is a major concern. As the speed of the cartoning machine is increased, the problem of premature component wear inevitably enters the picture and additional downtime of the packaging line can result. As downtime increases and the packaging line is not able to run, the lost production time mounts resulting in an obvious undesirable condition.

In this particular field, several conveyor systems with mechanical indexers have been produced, as mentioned above, and have met with some success. For example, U.S. Pat. No. 2,840,224 to Lefief, owned by the present assignee, discloses such an indexing conveyor assembly. Utilizing side running chains and staggered, rigid lugs containers on the line are able to be controlled successfully. However, because of the inherent nature of the arrangement, the speed is relatively slow. Also, there is no successful arrangement for providing controllable accumulation of containers in order to smooth out the feed supply between the peeks and valleys of the upstream operation. This prior arrangement of the '224 patent is typical of the best that has been available and which past practice indicates a need for running the cartoning machines at relatively high speeds. With the high speeds comes the increased possibility of jamming, as well as a greater probability of component wear and premature breakdown, all resulting in lower packaging line efficiency.

An alternative approach for this type of relatively reduced speed, mechanical indexing and transfer is shown in U.S. Pat. No. 3,543,911 to Brickson, also owned by the present assignee. In the system, since the containers are physically stopped and restatted by means of a flag stop interposed in the flow path of containers, an upper speed limit is quickly reached. The stopping and starting of articles tends to simply slow the packaging process too much to meet the demands of modern food processing lines.

Relatively recently, a general trend in the frozen, prepared food industry has been to move away from the flexible, aluminum foil trays to more sturdy plastic or paperboard (microwavable) trays, such as are used for food entree items. This change over has the potential for accelerating the move away from mechanical indexing arrangements to the more modern electronic phasing arrangements, similar to those that have been used with candy bars and other smaller items in the past. The paperboard trays are not as susceptible to interlocking during accumulation and can withstand close spacing or accumulation without damage. Being able to provide closely spaced, and even abutting articles of the paperboard trays has a potential of paving the way for moving away from the slower mechanical indexing systems of the prior art. This one factor of allowing a more constant supply of containers brings new thinking to the possibility of utilizing electronic controls of the type previously used in wrapping machines, as typified in the Bruno '963 patent, cited above.

A need therefore exists for a phasing conveyor system for providing a smooth, continuous flow of precisely spaced articles, such as microwavable food entree trays, for feeding a downstream cartoning machine or the like. Such a system would take advantage of the greater strength and more regular shape afforded by the paperboard containers now used in the food packaging field, and would be able to accommodate the faster food processing lines of today's technology.

SUMMARY OF THE INVENTION

It is accordingly, a primary object of the present invention to provide a phasing conveyor system for precisely phasing the flow of articles at a substantially increased speed.

Another object of the present invention is to provide article phasing on a conveyor system that can effectively utilize an upstream accumulation of articles in either closely spaced or abutting relationship.

Another but related object of the present invention is to provide a conveyor system with phasing and speed control of the articles so that a cartoning machine can be run at design speeds and articles can be provided to fill substantially every segment or flight of the target or infeed conveyor of that cartoning machine.

Still another object of the present invention is to provide a conveyor system for phasing and controlling the flow of closely spaced articles along a conveyor path, wherein not only the complexity, but also the footprint of the series of conveyors forming the system is minimized.

A related object of the present invention is to provide a conveyor system of the intelligent type described, wherein (1) phasing conveyor with a single article sensor and variable speed motor, and (2) a transfer conveyor is the minimum combination required to properly position articles for matching with defined moving segments of the downstream target conveyor.

A related object to the last mentioned object above of the present invention is to provide a conveyor system wherein the combination of one additional phasing conveyor and transfer conveyor in tandem is employed to increase the phasing efficiency and reliability.

Still another object of the present invention is to provide a conveyor system with phasing and control of closely spaced articles wherein controlled upstream accumulation of product is provided to increase the efficiency of the operation, and wherein the accumulation is not susceptible to jamming.

An additional related object is to provide a conveyor system utilizing phasing and transfer conveyors for positioning articles at precise intervals for matching the segments or flights of a target conveyor and wherein a high friction and low friction accumulation conveyors are provided to insure a constant, closely spaced flow of articles to allow each segment to be filled.

Additional objects, advantages and other novel features of the invention will be set forth in part in the description that follows, and in part will become apparent to those skilled in the art upon examination of the following text, or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention and described herein, a conveyor system for phasing and controlling the flow of closely spaced articles along a flow path to a target conveyor is provided. The phasing and controlling concepts can be used in a wide variety of applications, but is particularly useful in the prepared foods packaging industry where prepared food containers, such as microwavable paperboard entree trays, are received from upstream preparation equipment, such as food freezers. The conveyor system of the invention does allow adaptation to a variety of shapes of articles and can adapt its operation to receiving the articles in surges or bunches, or otherwise in a generally irregular or random fashion. Furthermore, the conveyor system of the invention operates in such a manner that varying atmospheric conditions, or a frozen or wet surface of the article, does not adversely affect the efficient phasing and control function.

In the preferred embodiment shown for the purposes of illustrating the present invention, the articles or trays are introduced from the upstream processing machines, they are precisely phased and speed controlled, and then are transferred to the downstream target conveyor, such as the infeed conveyor for a cartoning machine. As will be pointed out in more detail below, the final result of utilizing the phasing conveyor system of the present invention, is a precisely spaced, smooth and steady flow of articles regardless of the upstream conditions.

Advantageously, one of the prime features of the system is its simplicity, yet its ability to operate at the increased speeds necessary to accommodate the flow of product in a modern food processing plant. Furthermore, the phasing conveyor system of the present invention runs automatically, successfully adapting to surging or irregular flow of product from the upstream processing equipment, and thus providing substantially increased efficiency over the prior art mechanical indexing systems.

Thus, to initially introduce the articles to the article phasing conveyor system, a supply conveyor means is provided. This first of the several in-line conveyors establishes the flow of closely spaced articles so as to be substantially sufficient to match the number of segments or flights in a downstream target conveyor.

A phasing conveyor, which can be immediately downstream, or with other conveyors in between, receives the closely spaced articles along the flow path and a sensor, such as a photoelectric cell, detects each article in its phantom segment moving along the flow path of the conveyor system. A variable speed motor, such as a servo motor, is utilized to drive the phasing conveyor, and an electronic controller, responsive to the sensor, is utilized to adjust the motor to vary the speed. When the leading edge of the article is detected by the sensor, the conveyor either speeds up or slows down to correct the position of the article along the flow path, and thus precisely phase the article to match its defined segment. Of course, if no change is necessary, a null signal is given and no change of position is provided.

Downstream of the phasing conveyor is provided a transfer conveyor means operating at a faster, but substantially constant speed to accelerate each article, and thereby define and establish the proper gap from the trailing article. At the same time, this transfer conveyor of the system is operative to match the speed of the article to the target conveyor for further assuring proper positioning in its phantom segment, and thus in the proper segment or flight once the article arrives at the exit end of the system. As a result, the articles along the flow path of the system of the present invention are properly phased, gapped and speed controlled so as to assure maximum speed and efficiency of the system and, most importantly, assure filling of substantially every segment of the target conveyor. When the target conveyor is a part of a cartoning machine, this of course means that substantially every carton is filled and the efficiency of operation of the packaging line is greatly enhanced.

In the preferred embodiment, the transfer conveyor means includes at least one endless member with spaced lugs extending into the path to engage the articles at this position along the feed path. The lugs move at a substantially constant speed, which is the same as the target conveyor. An endless belt conveyor makes up the other part of the transfer conveyor means and operates at least partially coextensive with the movement of the lugs. The endless belt conveyor, upon which the article is positioned for feeding, operates at a differential speed with respect to the endless member and lug so as to cause engagement of the lug for final phasing to the target conveyor segment. While a bottom running endless member/lug arrangement is illustrated, in accordance with the broader aspects of the invention this can be either an overhead or side sweep arrangement. Also, the articles can be arranged to either engage the lug from behind by being fed on a belt conveyor that is running faster, or the article can be pushed from behind by allowing the belt conveyor to run slower.

Preferably, the endless members/lugs are provided in pairs orthogonally aligned across the path. The aligned lugs provide the advantage of allowing each article to be squared with respect to the corresponding segment or flight on the target conveyor just prior to entering it. In the preferred embodiment, the target conveyor and the endless members and lugs are driven by the same motor, and thus at the same speed, and the endless belt conveyor is driven by the same motor but faster so that the articles engage the slower running lugs from behind for the final phasing/squaring operation.

In accordance with another feature of the invention, an additional phasing conveyor and transfer conveyor means may be provided in tandem upstream in order to provide additional phasing, gapping and speed control of the articles. This increases the operational efficiency of the inventive system, but still does not increase the footprint of the machine to any substantial degree. By providing just two pairs of the phasing/transfer conveyors for initial and final phasing and speed control, the present conveyor system can rival the accuracy of much more complicated systems utilizing a great number of in-line conveyors for gapping, phasing and speed control, but all built on the same basic principle of the Bruno '963 arrangement.

The efficiency of the conveyor system of the present invention is further enhanced by providing an improved supply conveyor means including an unobstructed low friction accumulation conveyor to provide closely spaced articles that are at least substantially equivalent to the spacing of the segments of the target conveyor. This accumulation conveyor is upstream of the first phasing/transfer conveyor combination.

As an important adjunct to the supply conveyor means of the present invention, a high friction accumulation conveyor is positioned between the phasing conveyor and the low friction accumulation conveyor. The purpose of this second in-line conveyor of the supply arrangement is to shield the downstream phasing conveyor from being overrun with accumulated articles. This is done by providing the high friction surface, which in the preferred embodiment includes side-by-side rubberized conveyor belts, with a frictional coefficient sufficient to at least block forward sliding of the article positioned just upstream of the phasing conveyor. Advantageously, the high friction accumulation conveyor is driven by the downstream phasing conveyor in order to also provide prephasing of the articles.

Another important feature built into the preferred embodiment of the conveyor system is that the phasing/transfer conveyors are formed of a plurality of endless belts extending longitudinally along the flow path of articles and supported by common shafts including alternate drive and idler roller sections for the belts, respectively. Each of the belts so positioned is driven by the drive roller sections keyed to the shaft on the downstream end, with the upstream end of each conveyor being trained around the alternately positioned idler roller sections. With the operative runs of the belts being interdigitated in this manner, another key advantage is realized, and that is, that a substantially smooth conveying surface for easy transition of the articles between one conveyor and the next is provided. It is contemplated in the preferred embodiment that the belts are elastic O-rings, but it is clear that other types of belts with similar frictional properties can be used.

To further increase the smoothness of operation of the conveyor system, at both the entry and exit ends of the system a support rod carries relatively small diameter idler sleeves over which endless belt extensions are trained. These extensions are driven at the same speed as the adjacent conveyor. Preferably, the ratio of the diameter of the adjacent drive roller sections to the idler sleeves is at least 4:1.

With the conveyor system of the present invention, previously hard-to-handle articles, such as the frozen food entree trays, are handled in a continuous feed manner without any significant problems. The initial phasing conveyor in the line of conveyors either accelerates or decelerates the article to match the phantom segment, that in turn matches the actual moving segment or flight on the downstream target conveyor. An encoder, electronic controller and conveyor drive motors are utilized to assure proper position and speed matching under all circumstances. It is particularly important that the conveyor system can operate efficiently at high production speeds, or up to approximately 250 articles per minute without a carton being missed or a jam occurring. Further, because the system is provided with two pairs of phasing/transfer conveyors, any required touch-up phasing can be accommodated. Tests so far indicate that possibly 1 out of 60–100 articles in the conveyor system of the present invention require the touch-up phasing, and as such it is highly desirable to employ the preferred dual or split arrangement. The dual phasing arrangement is also useful to assure proper control even if the containers have uneven bottom surfaces, or surfaces covered with moisture or ice. Also, the dual arrangement with initial and touch-up phasing is desirable where the tray or other container happens to require offset or side-to-side disportionate filling. In this regard, the endless member/lug arrangement for the final phasing and squaring of the articles is also very important.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing:

FIG. 4 is a top view of the common drive shaft between the phasing and transfer conveyors illustrating the manner of use of the roller sections adapted to drive the phasing conveyor O-rings while allowing idling of the downstream transfer conveyor O-rings;

Reference will now be made in detail to the present preferred embodiment of the invention, the example of which is illustrated in the above described drawings.

DETAILED DESCRIPTION OF THE PREFERRED EMBODIMENT

Figure 1:
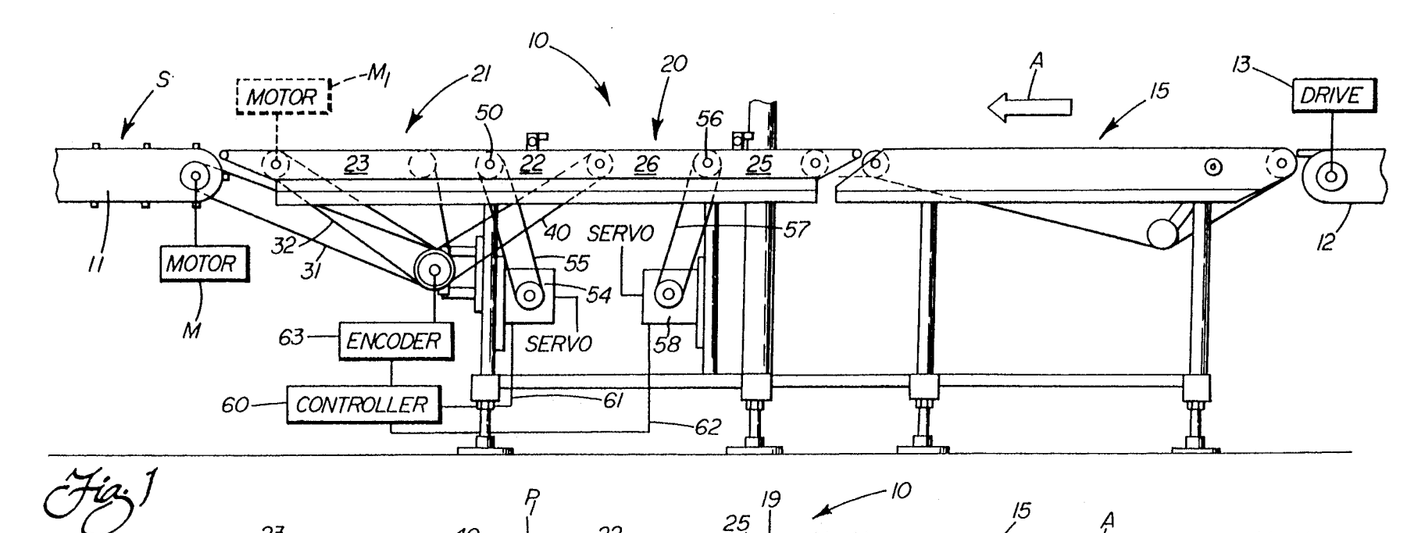
FIG. 1 is a side view of the conveyor system illustrating a preferred embodiment of the present invention and particularly adapted for feeding of food containers, such as frozen food entree trays.
Figure 2:
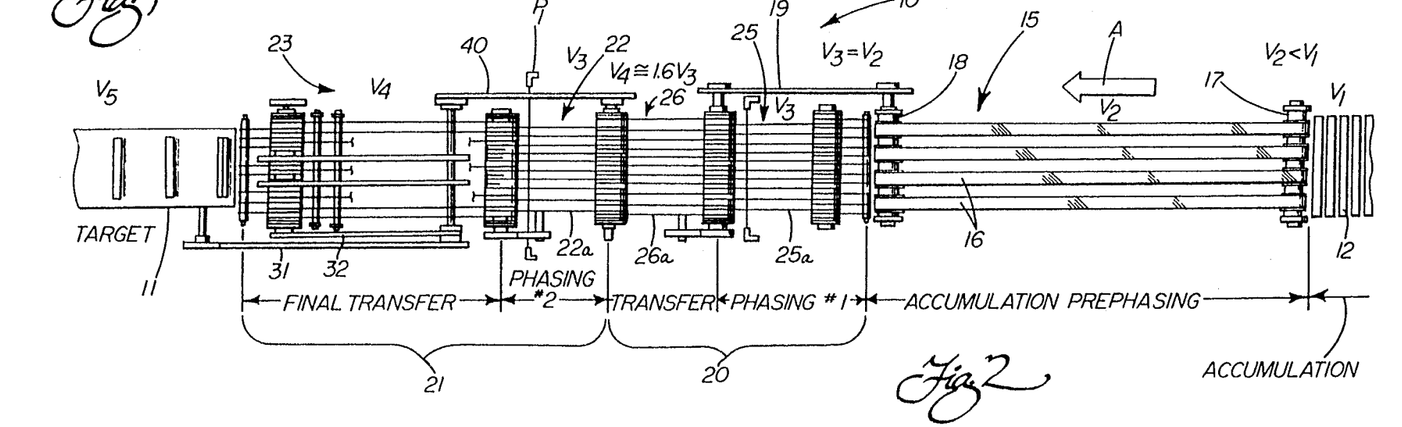
FIG. 2 is a top plan view of the conveyor system illustrating in more detail the accumulation and prephasing conveyors, the two pairs of phasing/transfer conveyors and the target conveyor.

Reference is now made to FIGS. 1 and 2 of the drawings, showing the phasing conveyor system 10 of the present invention. Advantageously, the phasing conveyor system 10 can be used in a wide variety of applications and is particularly useful in the prepared foods packaging industry. As indicated above, the objective is to precisely feed any type of articles, such as prepared food containers (see food entree trays T in FIGS. 5a–5d) so that they are properly phased and speed controlled to match segments or flights S on the downstream target conveyor 11. As indicated above, and as is well known in the industry, the articles arriving from upstream preparation machines are not always constant. Indeed, the flow is oftentimes in surges, or at least irregular so that proper phasing and timing is required in order to make sure that each of the articles is properly phased to the target conveyor 11. The phasing conveyor system 10 of the present invention is of tremendous advantage because it provides the required smooth, steady flow of properly phased articles regardless of the upstream conditions, or the nature of the article.

The conveyor system 10 actually includes a plurality of conveyors aligned end-to-end to establish a flow path of articles, as indicated by the arrow A in FIG. 1. Viewing FIGS. 1 and 2 from the right hand end, a low friction accumulation conveyor 12 is provided for receiving the articles from upstream processing and allowing the articles to be closely spaced, or even abutting before passing through the phasing conveyor system 10. As the articles are accumulated, the low friction surface of the accumulation conveyor 12 slides relative to the bottoms of the articles, and in this regard the cross pieces of the conveyor can be rollers, if desired. The conveyor 12 is driven by a suitable drive 13 in order to provide a given velocity $V_1$.

Next in line is the accumulation/prephasing conveyor of the present invention, generally designated by the reference numeral 15. It includes a plurality of side-by-side, high friction belts 16. In combination, the accumulation/prephasing conveyor 15 and the accumulation conveyor 12 form a supply conveyor means to establish the flow of articles in such a manner as to be substantially sufficient to match the segments S in the target conveyor 11, as will be seen in more detail below. The entry and exit ends of the conveyor 15 are supported by rollers 17, 18, respectively. As shown, the downstream roller 18 is the driving roller through belt 19. The velocity $V_2$ of this accumulation prephasing conveyor 15 is slightly less than the velocity $V_1$.

In accordance with the preferred embodiment of the invention, there are two pairs of phasing/transfer conveyors, generally designated by the reference numerals 20, 21. These two combinations perform essentially the same function of receiving the closely spaced articles along the flow path A, accelerating or decelerating each article, gapping each article from the trailing article and establishing the speed of each article to the same speed as the target conveyor 11.

The combination phasing/transfer conveyor 21 is actually two different conveyors 22, 23, respectively. A plurality of O-ring belts 22a, form the conveying surface of the phasing conveyor 22, as best shown by comparing FIGS. 2, 3 and 3a. It will be recognized in the illustration of FIGS. 3 and 3a, that many of the parts have been omitted in order to provide a clarity of illustration. Similarly, a series of side-by-side O-ring belts 23a form the transfer conveyor 23, which is just upstream of the target conveyor 11.

Figure 3:
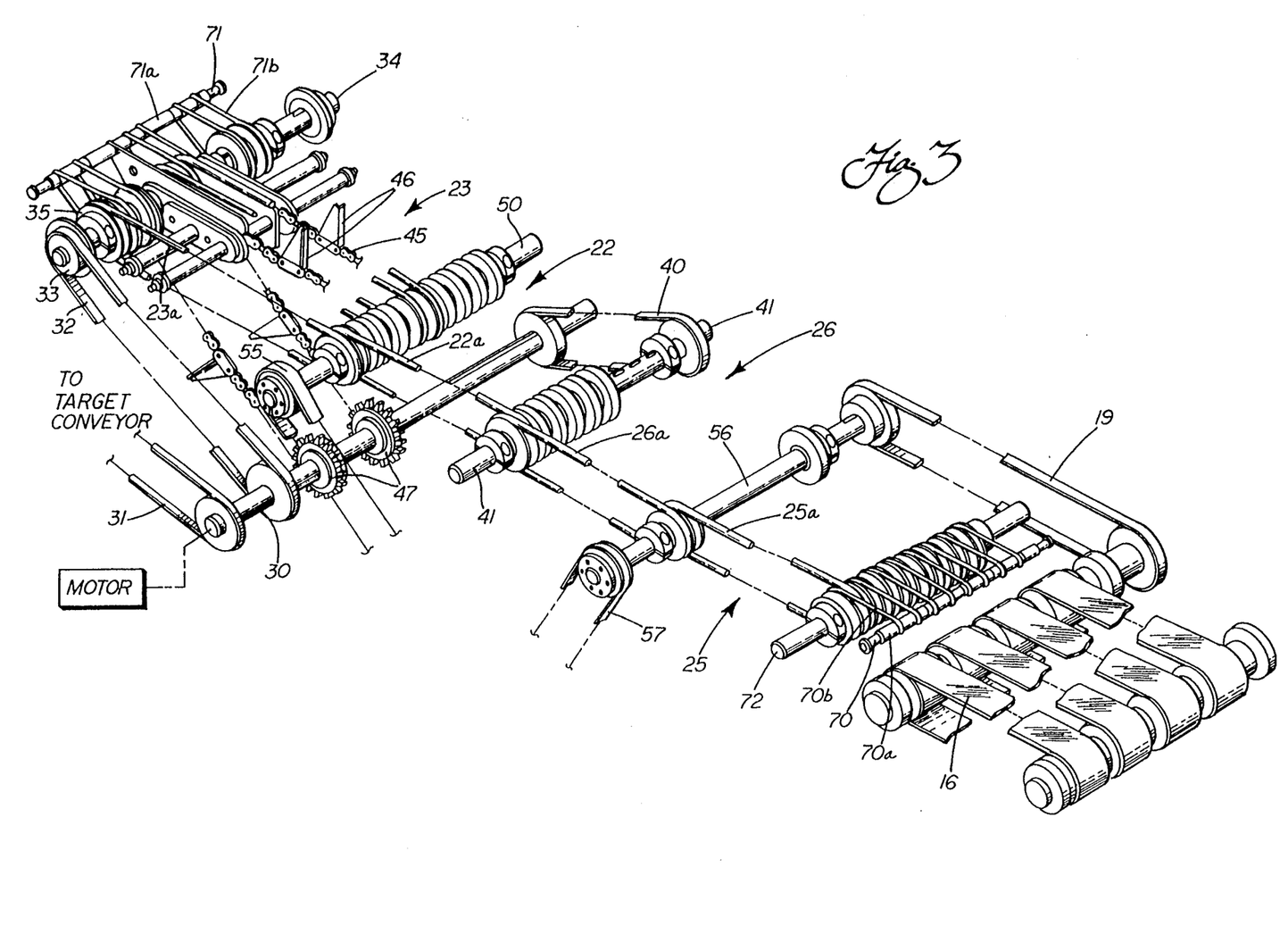
FIGS. 3 and 3a are perspective views of the conveyor system, as illustrated in FIG. 2, and particularly showing the overall layout of conveyor and the final phasing and squaring of each article prior to entering the target conveyor, respectively.

The phasing and transfer conveyor 20 employs similar individual conveyors 25, 26 using O-ring belts 25a, 26a, respectively (see FIGS. 2 and 3). Each of the phasing/transfer conveyors 20, 21 operate in basically the same manner so that a full description of only the phasing/transfer combination 21 is required for full understanding of the operation of these conveyors.

Positioned adjacent the phasing conveyor 22 is a photocell $P_1$, employed to detect the leading edge of each article as it moves along the flow path A. If the article is out of phase, such as in a position along the flow path A before or after where it should be, then the phasing conveyor 22 is accelerated or decelerated momentarily to reposition the article properly. As the article moves to the transfer conveyor 23, the article is accelerated and the proper gap is formed from the trailing article, and final phasing is provided. As illustrated in FIG. 2, the velocities $V_3$ of the phasing conveyors 22, 25 and $V_2$ of the accumulation prephasing conveyor 15 are approximately equal; $V_4$ the velocity of the transfer conveyors 23, 26 are approximately 1.6 $V_3$ and are the same as the velocity $V_5$ of the target conveyor.

In the preferred embodiment illustrated in the drawings, the target conveyor 11 is driven by a variable speed motor M that also drives the cartoning machine (not shown). Thus, the target conveyor 11 is driven at a substantially constant speed, but one that can be changed depending upon the requirements of the packaging line. Within the context of this application, the reference to substantially constant speed refers to driving of the conveyor wherein speed does not have to be changed in order to properly operate. As a speed of the cartoning machine and the target conveyor 11 are ramped up or down by the motor M, the remainder of the system responds accordingly.

With reference to FIGS. 2 and 3, the motor M drives a main drive shaft 30 through a first belt 31. A pulley on the drive shaft drives a second belt 32 and a smaller pulley 33 on a drive shaft 34. Drive roller sections 35 support the O-ring belts 23a (see FIGS. 3 and 3a). The main drive shaft 30 also drives the belt 40 connected to the drive shaft 41 of the transfer conveyor 26. Thus, in effect, the two transfer conveyors 23, 26 are driven in unison at a velocity $V_4$, as mentioned above.

The transfer conveyor 23 also includes endless chain members 45 positioned side-by-side and having a pair of orthogonally aligned lugs 46 spaced along the members 45. The endless chain members 45 extend over idler pulleys (not shown) and are driven directly from the main drive shaft 30 by guide sprockets 47. Since the O-rings 23a are driven at a faster speed than the lugs 46, each article supported on the O-rings 23a will be driven forwardly and against the lugs 46 for final phasing and squaring, as can be seen in detail in FIG. 3a.

Figure 3A:
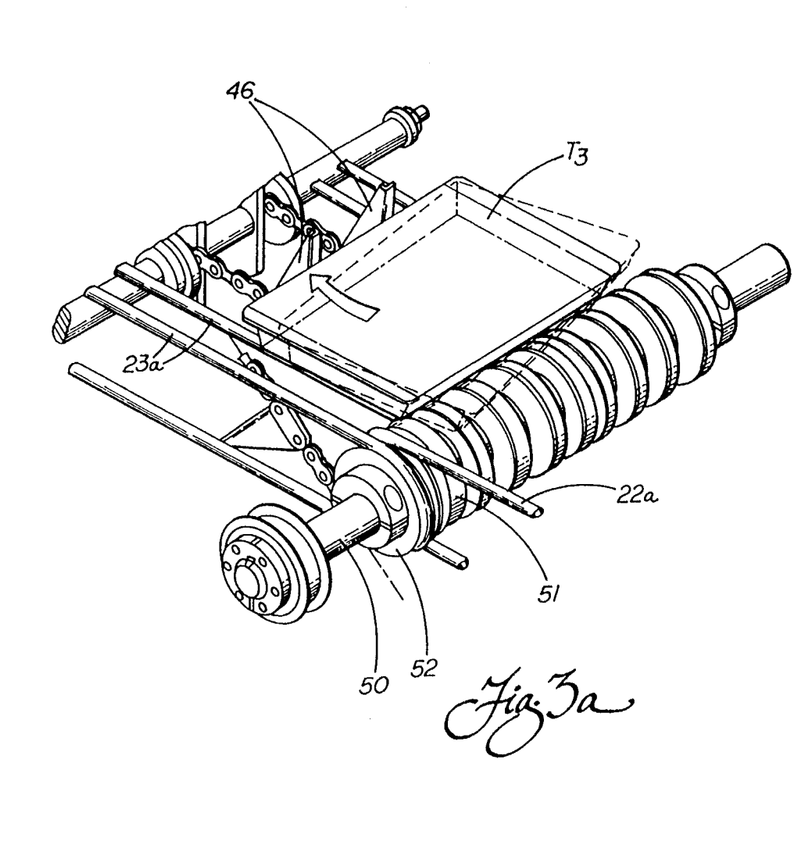

A common drive shaft 50 includes side-by-side drive and idler roller sections 51, 52 to support the O-ring belts 22a for the phasing conveyor 22 and the O-ring belts 23a of the transfer conveyor 23 (see FIGS. 3a and 4). As illustrated, each of the drive roller sections is mounted with a key 53; whereas, each of the idler sections 52 are free to rotate on the shaft 50 between the keys. The roller sections 51, 52 are fabricated of Delrin nylon or similar low friction material to allow proper relative rotation.

A drive belt 55 rotates the main drive shaft 50 from a servo motor 54. Similarly, a main drive shaft 56 serves to drive the phasing conveyor 25 through a belt 57 from a second servo motor 58. As a shaft 56 turns to move the O-ring belts 25a of the conveyor 25, the adjacent roller sections supporting the O-ring belts 26a are rotating freely relative thereto, and in response to being driven by the shaft 41. In this manner of providing interdigitated belts, the articles can move smoothly across the conveyors 22, 23 and 25, 26 without a gap. By being supported fully by the interdigitating O-ring belts, the articles are stabilized, further contributing to the efficiency of control along the full length of the conveyor system 10.

An electronic controller 60 is provided connecting over lines 61, 62 to the servo motors 54, 58, respectively. An encoder 63 provides constant pulse input to the controller 60 in order to constantly coordinate the operation of the conveyors.

In some instances, the motor M can be replaced by an independent servo, or other variable speed motor $M_1$, as shown by dashed line outline on FIG. 1. In this embodiment, the encoder 63 directly monitors the movement of the target conveyor 11 providing the appropriate inputs to the controller 60. As thus configured as an independent, stand alone unit comprising conveyors 15, 25, 26, 22 and 23, virtually any packaging or similar processing machine requiring precise phasing and speed control of articles, can be retrofitted by the phasing conveyor system 10 of the present invention.

At the entry and exit ends of the phasing/transfer conveyors 20, 21, there are provided separate support rods 70, 71, respectfully (see FIG. 3). Relatively small diameter idler sleeves 70a, 71a support O-ring belt extensions 70b, 71b, respectively. These endless belt extensions are trained around driver roller sections on the adjacent drive shafts 72 and 34, respectively. This arrangement provides a unique gap closing arrangement for the articles making the transition to the accumulation/prephasing conveyor 15 and the target conveyor 11.

The accumulation/prephasing conveyor 15 is driven by a belt 19 (see FIG. 3). This in effect couples the driving of the phasing conveyor 25 and the belts 16, thus providing prephasing of the articles.

In operation, and with specific reference to FIGS. 5a–5d, it can be seen that a plurality of articles are illustrated as trays T arriving in closely spaced or abutting relationship on the conveyor 12. Because of the low friction support surface, the trays T are able to either continue in forward feeding, or to slip until the abutting relationship is established. Downstream, the high friction belts 16 receive the trays T, and as shown any abutting relationship previously existing is continued, since the velocity $V_2$ of the belts 16 is slightly less than the effective velocity $V_1$ of the conveyor 12 (see FIG. 2).

Figures 5A, 5B:
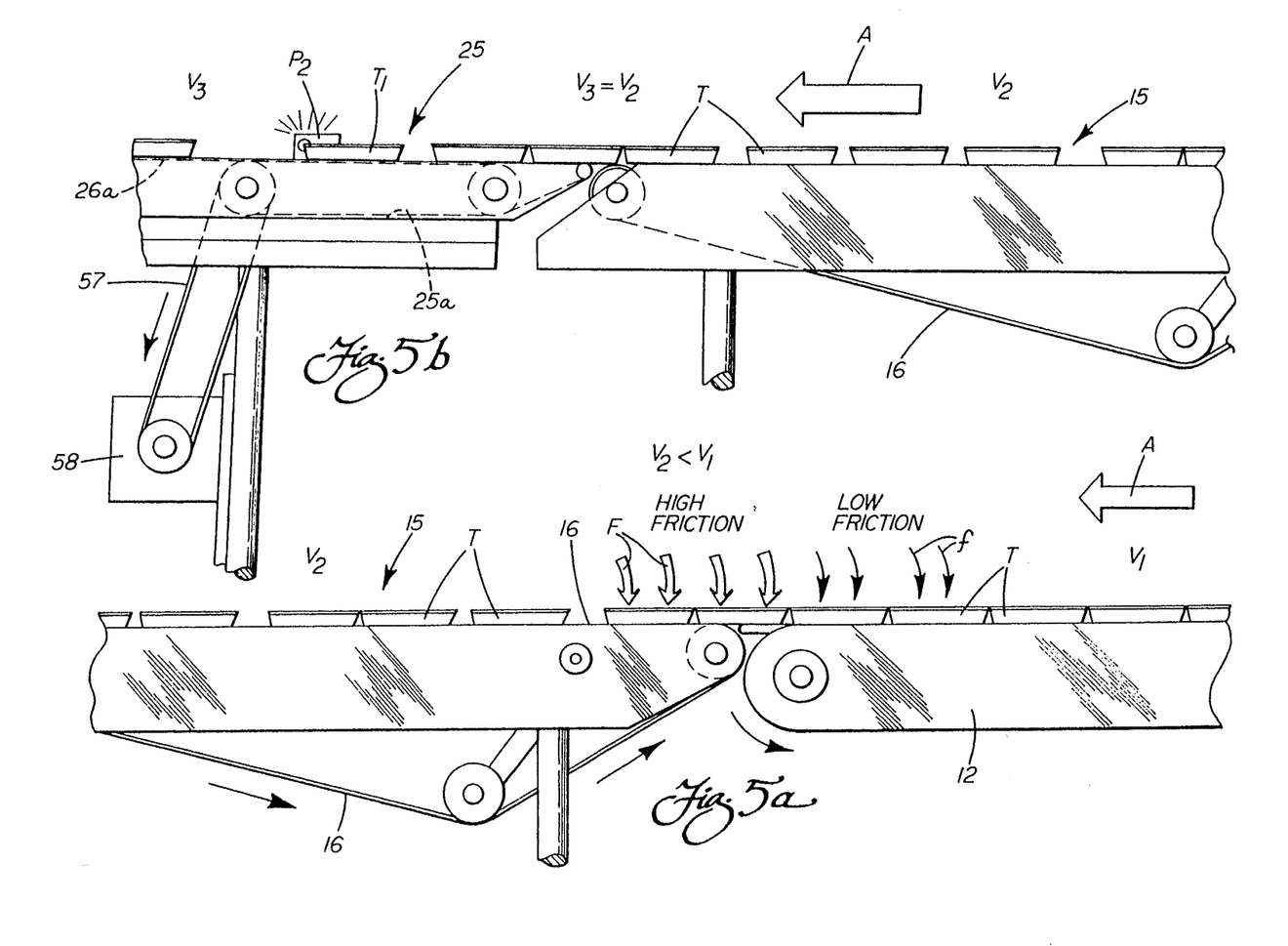
FIG. 5a is a schematic and enlarged side view showing the articles, such as food entree trays, moving between the low friction accumulation conveyor and the high friction accumulation conveyor of the supply conveyor means.
FIG. 5b is a similar side view showing the movement of articles and including the transition from the high friction accumulation conveyor to the phasing conveyor.

A significant function of the belts 16 with the high friction surface is to block the trays T from being moved forwardly, as illustrated by the high friction arrows F (see FIG. 5a). The high friction is sufficient to overcome the low friction of the accumulation conveyor 12, as represented by the arrows f.

Moving to FIG. 5b, the trays T continue to feed forward along the flow path A. Moving onto the phasing conveyor 25, the leading tray $T_1$ breaks the beam of photocell sensor $P_2$. In response to the timing, and as controlled by the encoder 63 and the controller 60, the servo motor 58 either increases or decreases in speed to properly phase this particular tray $T_1$.

Figures 5C, 5D:
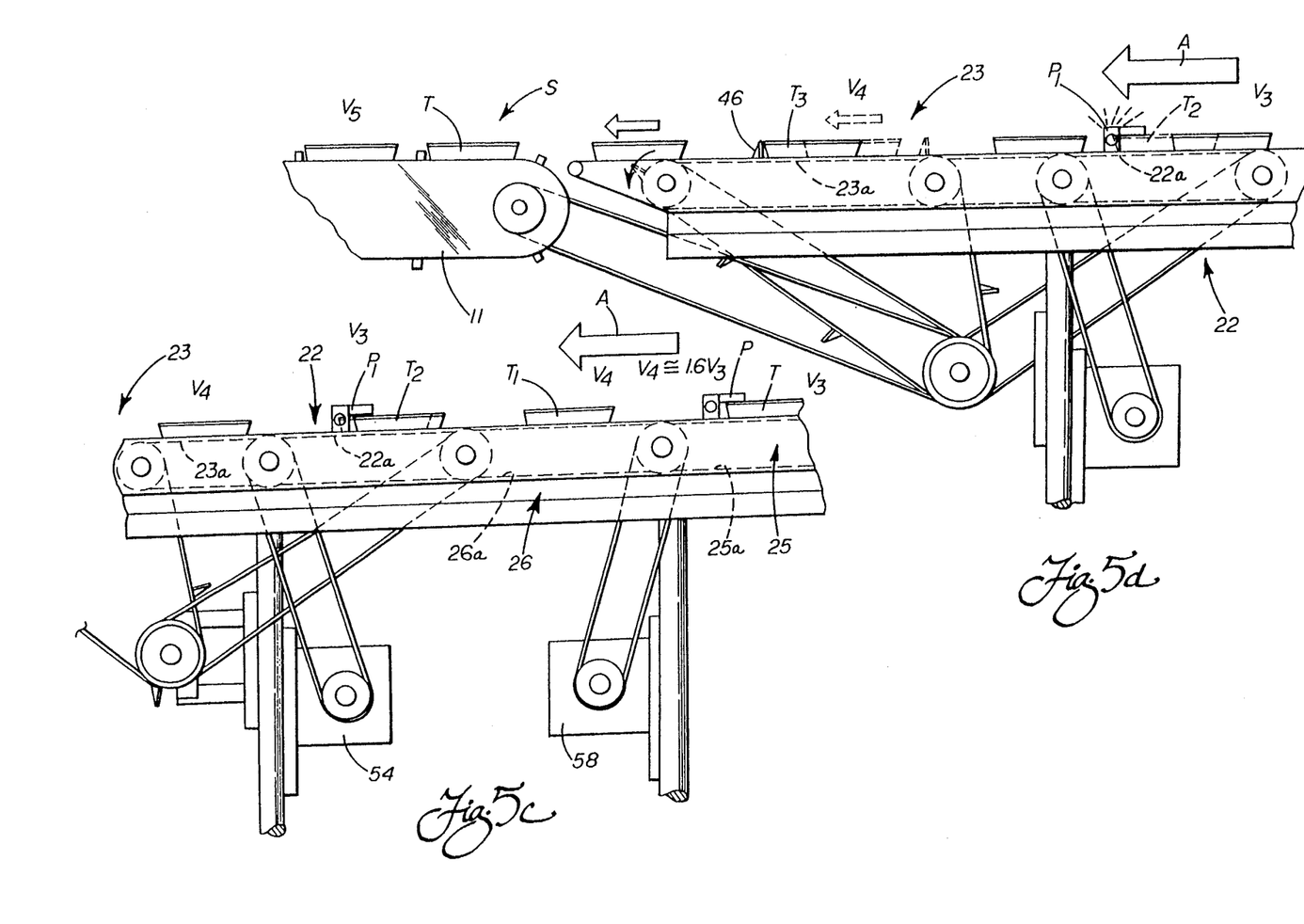
FIG. 5c is a similar side view showing the articles moving from the first in-line phasing/transfer conveyors to the second in-line phasing/transfer conveyors.
FIG. 5d is a similar side view illustrating the articles moving along the phasing/transfer conveyors and the transition to the downstream target conveyor in proper phased relationship.

In the next sequence along the flow path A (FIG. 5c), the tray $T_1$ is accelerated by conveyor 26 and an appropriate gap is formed with the trailing tray T since $V_4$ is greater than $V_3$ (see FIG. 2). At this point, the tray $T_1$ is considered to be in phase and properly controlled as to speed with regard to the segment S of the target conveyor 11. With reference still to FIG. 5c, the photocell $P_1$ is ready to touch-up the phasing/speed control of the previous tray $T_2$. When the photocell beam of the sensor $P_1$ is broken, then the O-ring belts 22a of the conveyor 22 are accelerated or decelerated in order to provide the touch-up needed. This relationship can be seen best in FIG. 5d where the dotted line tray $T_2$ is shown with the leading edge breaking the beam. Also as shown in FIG. 5d, as the tray $T_3$ (see also FIG. 3a) is moved forward by the faster running belts 23a, the lugs 46 are engaged by the leading edge. The tray $T_3$ is thus advantageously provided with a final phasing operation since the lugs 46 correspond to the leading edge of the corresponding segment or flight S. In addition the tray $T_3$ is squared so that in the event it is inadvertently skewed during its travel along the system 10, it is now ready for entry into its appropriate segment S of the target conveyor 11.

In summary, the advantageous results and advantages of the phasing conveyor system 10 of the present invention can now be more fully realized. Closely spaced trays T entering the system at the accumulation/prephasing conveyor 15 are capable of being fed forwardly along the pair of phasing/transfer conveyors 20, 21 so as to be in perfect position once the target conveyor 11 is reached. As each of the sensors $P_1$, $P_2$ is intercepted by the leading edge of the trays, the servo motors 58, 54 respond in order to either accelerate or decelerate for proper phasing. The phasing conveyors 22, 25 operate in a cumulative manner so that the system is very effective for assuring proper positioning of all types of articles. The transfer conveyors 23, 26 provide not only speed control, but also serve to provide final phasing by virtue of the lugs 46 being engaged. Each tray T is also squared in the event that the tray is skewed, as shown in FIG. 3a.

With the conveyor system 10 of the present invention, any type of hard-to-handle articles, such as the frozen food entree trays T, are easily accommodated. The feed along the conveyor system 10 is continuous in order that maximum speed, up to 250 cartons per minute is obtainable. The pair of phasing/transfer conveyors 20, 21 assures that proper phasing is accomplished so as to allow easy filling of each of the segments S of the target conveyor 11. As indicated, the phasing arrangement of this invention is effective even where the articles have uneven bottom frictional surfaces, or the surfaces are covered with moisture or ice. Similarly, offset or side-to-side disportionate weighted articles, such as food filled trays T, are efficiently accommodated.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A conveyor system for phasing and controlling the flow of closely spaced articles along a flow path to a target conveyor having defined moving segments at precise intervals, comprising:
   supply conveyor means to establish the flow of articles so as to be substantially sufficient to match the number of said segments;
   a phasing conveyor receiving the closely spaced articles in the flow path;
   sensor means adjacent said phasing conveyor for detecting each one of said articles in a segment along the flow path;
   a variable speed motor for driving said phasing conveyor;
   a controller responsive to said sensor means for adjusting said motor to vary the speed of said phasing conveyor in order to phase each said article to match its defined segment upon a transfer conveyor means; and
   said transfer conveyor means operating at a faster but substantially constant speed downstream of said phasing conveyor to accelerate each article to both establish a gap or segment upon said transfer conveyor and to match the speed of each article for positioning in the corresponding segment of said target conveyor;
   said phasing conveyor and said transfer conveyor means each comprising a plurality of endless belts extending longitudinally along said flow path, a common support shaft including alternate drive and idler roller sections for said belts, respectively; said belts for said phasing and transfer conveyors being trained around the roller sections so that the operative runs are interdigitated to provide a substantially smooth conveying surface and a second support shaft including drive roller sections downstream of said common support shaft driven by a substantially constant speed motor for driving the transfer belts;
   whereby the articles along said flow path are phased, gapped and speed controlled so as to be assured of filling substantially every segment of said target conveyor.

2. The conveyor system of claim 1 wherein said belts are elastic O-rings.

3. The conveyor system of claim 2 wherein is provided a support rod downstream of said second support shaft, relatively small diameter idler sleeves on said rod, endless belt extensions trained around drive roller sections on said second support shaft and said idler sleeves on said rod to provide a substantially smooth transfer surface for said articles in transition to said target conveyor.

4. The conveyor system of claim 3 wherein the ratio of diameter of said drive roller sections to said idler sleeves is at least 4:1.

* * * * *